March 9, 1943.   W. G. HOELSCHER   2,313,438
FLUID OPERATED GEAR SHIFTING MECHANISM
Filed July 18, 1940

Forward  Neutral  Reverse

INVENTOR.
William G. Hoelscher
BY
Wood & Wood
ATTORNEYS

Patented Mar. 9, 1943

2,313,438

UNITED STATES PATENT OFFICE 2,313,438

FLUID OPERATED GEAR SHIFTING MECHANISM

William G. Hoelscher, Cincinnati, Ohio, assignor to The American Tool Works Company, Cincinnati, Ohio, a corporation of Ohio Application July 18, 1940, Serial No. 346,185

3 Claims. (Cl. 277—24)

This invention relates to fluid operated gear shifting or speed changing mechanisms. It is particularly directed to an improved apparatus and valve arrangement wherein the operations of selecting and shifting may be performed independently but through a common lever.

It has been the object of the present inventor to provide a control lever and valve arrangement constituting a gear selecting and shifting means which is compactly arranged and easily operated from a single lever; this lever in one direction of movement selecting the speed and in another direction of movement effecting the gear change.

This object may be achieved in a structure including a valve shifting plunger movable axially for admitting the fluid under pressure from the point of supply to the selector valve and a rotatable element associated with said plunger valve, the rotation of which will operate the selector valve. These movements, that is, the axial plunger valve movement and the rotatable movement, are brought about through a single lever which has a compound movement, the respective movements being independently performed.

The subject matter of this application pertaining to the fluid gear shifting apparatus apart from the valve organization above set forth, is described and claimed in a copending application filed as a division of this application on August 22, 1942, and bearing Serial No. 455,761.

Other objects and certain advantages will be more fully apparent from a description of the drawing in which.

Figures 1, 2:
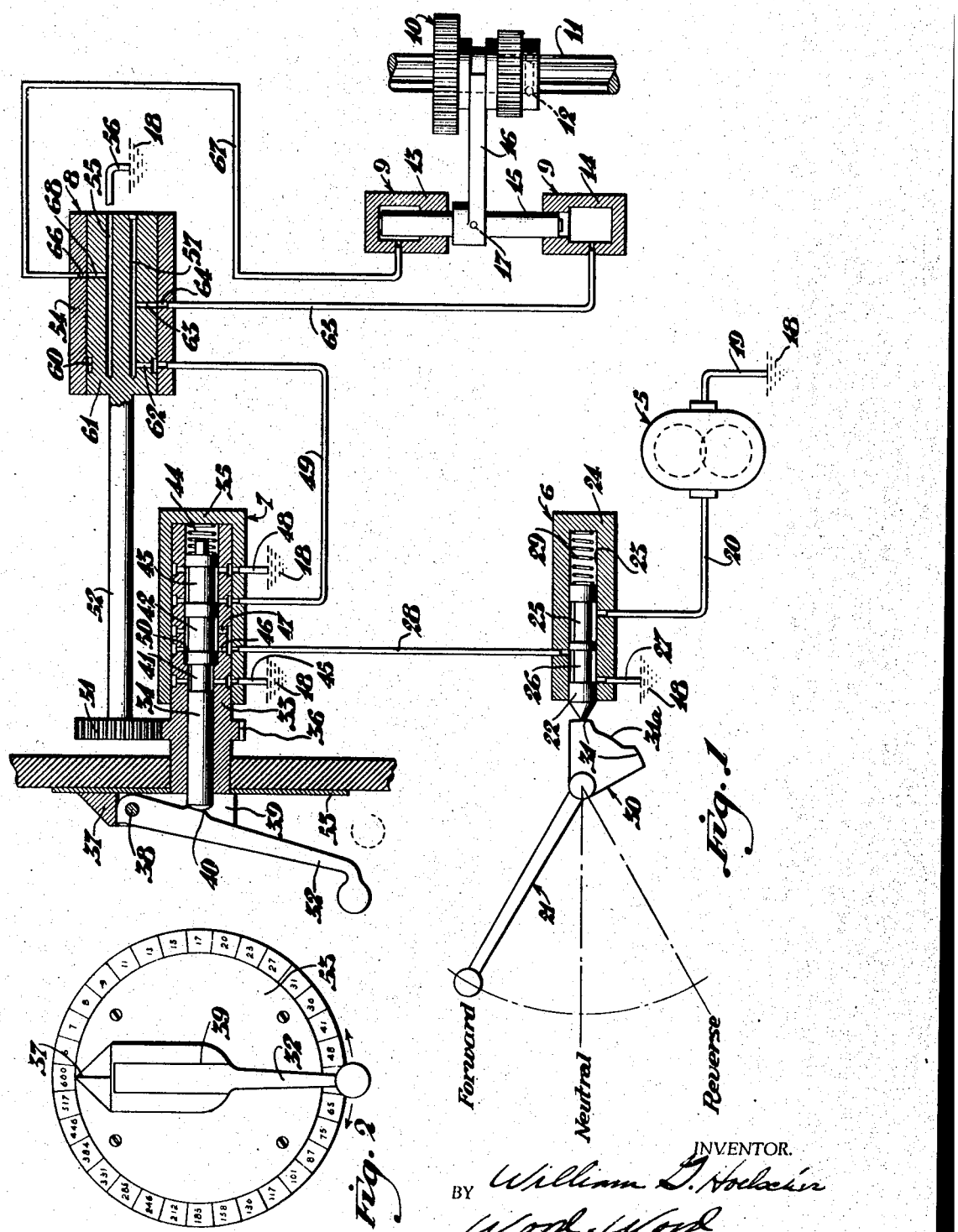
Figure 1 is a diagrammatic view showing the circuit with the elements of the circuit shown in section for illustrating the circulation through the various valves.
Figure 2 is a face view of the selector dial means and gear shift control means.

Referring to the drawing, the gear shifting system includes an oil pump 5, a shut-off valve 6, a shifting valve 7, a selector valve 8, and gear shifting cylinders 9. The valves are in the circuit in the order named. The shifting power is represented by the oil pressure delivered by the pump to the shifting cylinders. Therefore, with the shut-off valve closed, the gear shifting system is ineffective.

Although only one gear shifting unit and one gear cluster are illustrated, it is obvious that a plurality may be used. The gear cluster to be shifted is indicated at 10 and is slidably mounted on a splined shaft 11. To retain the cluster in engaged or disengaged positions, the splined shaft is provided with detent means shown in dotted lines at 12. The gear shifting unit comprises two cylinders 13 and 14, one at each end of a plunger 15. A yoke 16, engaging a groove in the gear cluster is pinned to the plunger at 17. Thus, to move the cluster for a desired shift, one cylinder is charged as the other one is exhausted.

The pump 5 draws oil from a sump, indicated at 18, through an intake line 19, and delivers it under pressure through a line 20 to the shut-off valve 6. The shut-off valve is open only when the lever 21, which controls the forward and reverse clutches (not shown) of the drive means to the transmission, is in neutral. Consequently, oil pressure is permitted to pass through the shut-off valve to the other valves in the circuit to effect a shift only when the gears in the transmission are entirely disconnected from the drive means.

The shut-off valve comprises a plunger 22 which slides in a cylinder 23 in a casing 24. The plunger includes two grooves. When the valve is closed, one of the grooves 25 is in communication with the pressure line 20 from the pump. At this time, the other groove 26 is in communication with the sump through an exhaust line 27, and the shifting valve 7, through a line 28. The plunger is under the influence of a coil spring 29 which tends to move the plunger to connect the lines 20, 28 through groove 25.

The end of the plunger opposite the coil spring is tapered and extends from the casing 24 to contact the face of a cam 30 which is fixed to the shaft of the control lever 21. When the control lever is in forward or reverse positions, the high sections 31 of the cam face contact the plunger, thus forcing the plunger back into the casing against the pressure of the coil spring for closing the valve. When the control lever is in neutral, the low section 31a of the cam face contacts the plunger, thus permitting the spring to force the plunger outwardly to open the valve.

The shifting valve 7 is controlled by a selector handle 32. It is effective only when the shut-off valve connects lines 20 and 28. The shifting valve comprises a body 33 in which a plunger 34 slides, and a casing 35 in which the body 33 is rotatively journalled. The body extends from the housing and includes a gear 36 and a pointer element 37 both of which are formed integrally with or fixed to the body and rotate with it. The selector handle 32 is pivoted on a pin 38 in a slot 39 in the pointer element. The pivot point is to one side of the center of rotation adjacent the indicator point o. the pointer element while the handle extends diametrically across the axis of rotation of the valve.

The selector handle 32 has two distinct movements. When it is rotated, it sets up the selector valve 8 to make certain shifts. When pushed in, it actuates the plunger of the shifting valve for causing the shifts by permitting passage of the fluid to the selector valve. One end of the plunger 34 extends from the casing into the slot in the pointer element and is contacted by a boss 40 on the underside of the handle 32.

The plunger 34 has two sections of different diameters. The smaller diameter is provided with an annular groove 41. The larger diameter is provided with two annular grooves 42 and 43. A coil spring 44 under compression, between the inner end of the plunger and the end of the casing bore, tends to hold the plunger 34 out against the selector handle. When in this position, the groove 41 in the smaller diameter section of the plunger is in communication with the sump 18 through an exhaust line 45. The groove 42 in the larger diameter section is in communication with the line 28 from the shut-off valve through two ports 46 and 47. The groove 43 is in communication with the sump through an exhaust line 48 and with the speed selector valve through a pressure line 49. When the plunger 34 is in its second position, i. e. when the selector handle has been pushed in, the exhaust line 45 is closed, line 28 is open to groove 41 through port 46 and to line 49 through port 47, and the exhaust line 48 is closed. The operation of this valve, in relation to the circuit, will be discussed below.

As stated above, the plunger 34 of the shifting valve 7 has two different diameters. The differential exists just beyond the groove 41. When the plunger is in its out position, the shoulder 50 between the portions of different diameter abuts a shoulder in the body 33. When the selector handle is pushed in, the shoulder 50 on the plunger is moved between the two ports 46 and 47. Thus with the shut-off valve open, oil pressure is admitted to groove 41 through port 46. At this time, the exhaust line 45 has been closed and groove 42 has been moved to include port 47 and the opening to line 49. Due to the difference in areas, as provided by the shoulder at 50, the oil pressure overcomes the spring pressure and holds the plunger in.

When the selector handle is pushed in with the shut-off valve closed, no pressure exists in groove 41. Under these circumstances, the coil spring 44 returns the plunger and handle to their out positions just as soon as the operator releases the handle.

The gear 36 meshes with a gear 51 keyed to the end of a shaft 52. The speed selector valve includes a rotary valve element 61 to which the shaft 52 is directly connected. Gears 36 and 51 are identical. Thus, since gear 36 rotates with the pointer, the rotary speed selector valve also rotates with the pointer. Naturally, the gear link causes a reverse motion between the two, but they maintain relative positions as they rotate. A stationary dial 53 is provided for the pointer, indicating the positions of the selector valve.

The rotary selector valve distributes and relieves the oil pressure in the correct shifting cylinders to shift the gear clusters in the transmission into the speed corresponding to the positions indicated on the dial. This description discloses only one such position since the construction of these rotary valves is well understood in the art. The rotary valve is journalled in a casing 54 and includes two longitudinal passages, an exhaust passage 55 open at all times through a line 56 to the sump, and a pressure passage 57 open at all times to the pressure line 49 of the circuit.

The line 49 is in communication constantly with an annular groove 60 in the periphery of the rotary valve element 61. A port 62 extends radially from this groove into the passage 57. Another port 63 extends radially from this passage 57 and is adapted to register with a port 64 into which line 65 is connected. This line 65 extends to the cylinder 14 of the shifting unit. Another port (not shown) extends from the passage 57 for registry with a port 66 into which the pipe 67 is connected leading to cylinder 13 of the shifting unit. Each of these pipes 65, 67 will register with respective exhaust ports one of which is shown at 68. As shown, exhaust of cylinder 13 is taking place through port 68.

Operation

With the clutch lever 21 in either forward or reverse position, the shut-off valve 6 is closed and the pressure to the shifting valve 7 is relieved. The operator may now select the speed for his next operation by setting the pointer 37. After he has selected the next speed, he can stop, reverse or continue on at the same speed for a number of operations without disturbing or affecting the pre-selection, even though the clutch lever 21 is moved into neutral many times during this period.

To effect a change, the selector handle 32 must be pushed in while the clutch lever is in neutral. The selector handle is foolproof. If the operator should, by chance, push the selector handle in while the clutch lever is in either forward or reverse position, the coil spring behind the plunger 34 would move the plunger out again.

As an example, let us say that the selector mechanism is set to run at speed A. The forward clutch is engaged, the shut-off valve is closed, and the selector valve 8 is still set to align the necessary ports to effect the shift resulting in speed A. The gear cluster at this time is being held in its respective position by the detent 12. While the machine is running at speed A, the operator may set the selector mechanism, by turning the selector handle 32, for speed B. The only change in the circuit takes place in the selector valve 8. Here, the ports necessary to effect speed B, and the ports necessary to disengage the gears of speed A are aligned. If the operator desires to continue at speed A for several operations, he may do so as long as he does not push in the selector handle while the clutch control handle is in neutral.

Now, when the operator wants to change to the preselected speed B, he throws the clutch control lever into neutral. This opens the shut-off valve 6, directing oil pressure through line 28 to the shifting valve 7. He then pushes in the selector handle to direct the oil pressure through the shifting valve to the selector valve. The selector handle remains in, due to the oil pressure on the differential plunger 34. The oil pressure is directed to the shifting cylinders through the line 49 to the selector valve 8, which had been previously set for speed B. As soon as the clutch lever is moved out of neutral the pressure on the selector valve is relieved and the spring 44 returns the selector valve to out position.

Having described my invention I claim:

1. Gear shifting apparatus comprising; a valve consisting of a stationary body, said body including a port adapted to receive fluid under pressure for admitting the fluid to the interior of said body, and including discharge ports, a rotatably mounted tubular element disposed in said body including ports connecting its exterior to its bore, an axially shiftable valve element disposed in said rotatable element and on its axis, a lever for rotating said rotatable tubular element, said lever engaging said valve element and being depressible for moving said valve element axially, a rotatably mounted selector valve adapted to be supplied with fluid from said discharge ports of said valve body, and a transmission connection from said rotatably mounted element to said selector valve for rotating said selector valve when said rotatably mounted element is rotated.

2. A valve mechanism for shifting gears comprising; a stationary cylinder, a rotatable cylinder mounted in said stationary cylinder, said rotatable cylinder and said stationary cylinder including ports constantly in communication for delivering fluid to the bore of said rotatable cylinder, a valve element translatably mounted in the bore of said rotatable cylinder, said rotatable cylinder including an indicator finger, fixed to and projected radially from its outer end, an indicator plate fixed relative to said finger, a lever pivotally mounted toward the end of said indicator finger for swinging movement against the end of said translatable valve element, said indicator finger including a radial slot containing said lever, whereby said rotatable cylinder may be rotated by means of the lever or whereby the valve element may be translated by means of the lever, and a selector valve, said selector valve and rotatable cylinder being connected by a transmission for imparting movement to said selector valve when said rotatable cylinder is rotated and said selector valve being adapted to be supplied with fluid from said ports in said rotatable cylinder controlled by said translatable valve element.

3. A fluid operated gear shifting mechanism, comprising a selector valve, a shifter valve, a casing slidably containing said shifter valve, fluid supply conduit means in said casing controlled by translation of said shifter valve, said casing being rotatably mounted, a valve body containing said rotatably mounted casing, there being passageways and ports arranged in said valve body and casing for delivering fluid to the bore of said casing, an indicator dial, an indicator finger fixed to said rotatable casing and movable relative to said dial, a transmission connection between said casing and said selector valve for transmitting motion from said casing to said selector valve, means for delivering fluid under pressure through said shifter valve to said selector valve, and a lever pivotably mounted on said finger for swinging motion longitudinally of the axis of the shifter valve, said finger engaged with said casing against relative rotation, whereby rotation of the lever will rotate said finger, said lever disposed in contact with the shifter valve and, said shifter valve being spring urged against the lever, whereby when the lever is rotated, the selector valve is set, and when the lever is depressed, the shifter valve is operated to admit the fluid to the selector valve for an appropriate shift.

WILLIAM G. HOELSCHER.